United States Patent Office 3,152,120
Patented Oct. 6, 1964

3,152,120
PROCESS FOR THE PREPARATION OF CONANINE DERIVATIVES AND NOVEL DERIVATIVES PREPARED THEREBY
Vlasios Georgian, Evanston, Ill., and James F. Kerwin, Broomall, and Manfred E. Wolff, Elkins Park, Pa., assignors to Smith Kline & French Laboratories, Philadelphia, Pa., a corporation of Pennsylvania
No Drawing. Filed Sept. 30, 1959, Ser. No. 843,334
18 Claims. (Cl. 260—239.5)

This invention relates to a process for the preparation of conanine derivatives and to novel substituted conanine derivatives prepared thereby. Further, this invention relates to novel 20-(N-alkyl-haloamino) steroid intermediates useful in the process as is disclosed hereinafter.

The conanine derivatives prepared by the process of this invention are useful as intermediates in the preparation of 18,20-oxygenated steroids which have valuable therapeutic activity. More specifically, the 18,20-oxygenated steroids prepared from the conanine derivatives obtained by the process of this invention are useful as diuretic, anti-inflammatory and anabolic agents, and as blockers of aldosterone (anti-aldosterone).

The C–18 oxygen functionalized steroids have recently gained importance as blockers of aldosterone, the principal hormone responsible for sodium retention. Several clinical disorders such as cirrhosis, nephrosis and congestive heart failure lead to sodium retention and edema, and are associated with increased secretion of aldosterone. C–18 oxygenated steroids in blocking the effects of aldosterone increase sodium excretion leading to a diuretic action and thereby are useful therapeutic agents. C–18 oxygenated steroids prepared through this invention also are useful in the synthesis of aldosterone-like compounds. In addition, the close relationship of the C–18 oxygenated steroids prepared from the intermediates of this invention to the known adrenocortical and sex hormones ascribe to the former compounds some of the latter's pharmacological effects such as anti-inflammatory and anabolic properties.

Conanine is an amino hydrocarbon having essentially a steroid nucleus with an 18→20 pyrrolidine ring as represented by the following structural formula:

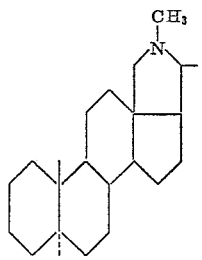

Many "aminoconanines" are known, for example the naturally occurring holarrhena alkaloids some of which are represented as follows:

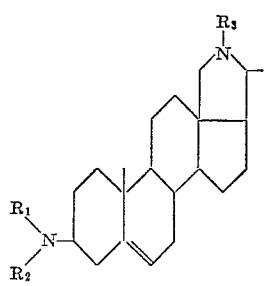

when $R_1$, $R_2$ and $R_3$ are hydrogen or methyl. The preparation of two conanines from 20-(N-chloro-N-methylamino) steroids has been described in the literature. These prior art compounds however are completely unoxygenated and contain no functional groups other than a 3-dimethylamino moiety. In the prior art methods, the 20-(N-chloro-N-methylamino) steroid derivative is irradiated in concentrated sulfuric acid (80–90%) with ultraviolet light and further treated with base according to the general conditions for the Loeffler-Freytag reaction to give the conanine derivative. However, the general applicability of sulfuric acid in the conversion of 20-(N-haloamino) steroids to conanine derivatives is limited by many disadvantages, for instance: (1) many steroids are insoluble or not readily soluble in sulfuric acid; (2) stability of the steroids in the acid is a problem, particularly N-haloamines and oxygenated steroids; and (3) the large volumes of the acid necessarily employed are difficult and costly to remove from the reaction mixture during the workup procedure.

It has now been found that conanine derivatives can be advantageously prepared according to the process of this invention, schematically represented as follows:

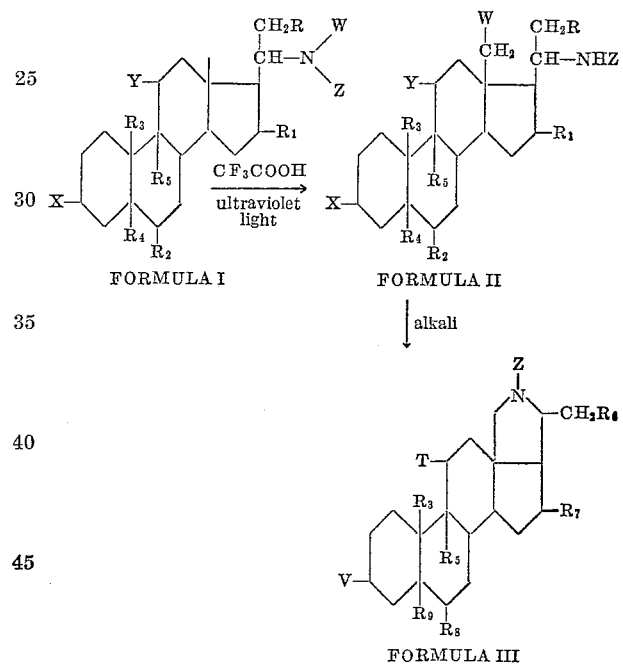

when:
X represents hydrogen, hydroxy, acyloxy or keto, preferably hydroxy, acyloxy or keto;
Y represents hydrogen, acyloxy or keto;
V and T represent hydrogen, hydroxy or keto;
R represents hydrogen, hydroxy or acyloxy;
$R_1$ represents hydrogen, hydroxy, acyloxy or methyl;
$R_2$ represents hydrogen, fluoro, hydroxy, acyloxy or methyl;
$R_3$ represents hydrogen or methyl;
$R_4$ represents hydrogen or acyloxy;
$R_5$ represents hydrogen or fluoro;
$R_6$ and $R_9$ represent hydrogen or hydroxy;
$R_7$ represents hydrogen, hydroxy or methyl;
$R_8$ represents hydrogen, fluoro, hydroxy or methyl;
Z represents lower alkyl; and
W represents halogen of atomic weight less than 80, such as chlorine or bromine, preferably chlorine.

It is desired to point out that the general structural formulae depicted here and in the claims are intended to cover substituents in the α or β position and steroids with an A/B cis or A/B trans juncture. Further, where used herein the term acyl is used to detonate an organic hydrocarbon carboxylic acid radical having not more than 6 carbon atoms such as alkanoyl, for example acetyl, trifluoroacetyl or hemisuccinyl; and the term lower alkyl is used to denote an aliphatic hydrocarbon group having not more than 6 carbon atoms. The term conanine where used herein generically is intended to include the 20α or 20β and the 5α and 5β configurations, as well as N-lower alkyl derivatives.

The conanine derivatives of FORMULA III are prepared as shown above from the 20-(N-alkyl-N-haloamino) steroids of FORMULA I by treatment with trifluoroacetic acid and ultraviolet light followed by alkali in accordance with the novel process of this invention. In this process, the 20-(N-alkyl-N-haloamino) steroid is irradiated with ultraviolet light in the presence of trifluoroacetic acid. The novel process of this invention is a marked improvement over the prior art methods. The use of trifluoroacetic acid instead of sulfuric acid has many advantages, for instance: (1) the steroids are more soluble in the trifluoroacetic acid, thus requiring a smaller volume of solvent, (2) the steroids, even those with sensitive functional groups such as the oxygenated derivatives and N-haloamines are stable in trifluoroacetic acid, (3) the volatility of the trifluoroacetic acid facilitates the workup procedure of the reaction mixture, (4) recovery of the acid is possible, and (5) excellent yields often ranging above 75% are obtained. A distinct advantage of the process of this invention is the availability of a rapid and simple synthetic route to oxygenated conanine derivatives.

Advantageously, the 20-(N-alkyl-N-haloamino) steroid is dissolved in trifluoroacetic acid and irradiated with ultraviolet light under nitrogen atmosphere at a temperature in the range of from about −20° C. to about 40° C., preferably at room temperature or about 25° C., until titration for residual N-haloamine indicates the reaction is complete. The course of the reaction is followed by periodically removing several drops of reaction solution and adding several ml. of 5% potassium iodide-acetone-water solution. The resulting color change is qualitatively compared with a similar sample removed before irradiation and treated similarly to produce a dark red color standard. The completion of the reaction is indicated when the titration procedure produces an almost colorless solution.

The trifluoroacetic acid is then removed by evaporation in vacuo with provisions made for recovering the acid. The residual 18-halo steroid intermediate represented by FORMULA II above is then reacted with alkali, advantageously without isolation. Thus, the residue consisting essentially of the 18-halo steroid intermediate is treated with an alkali metal hydroxide, such as potassium or sodium hydroxide. Advantageously, the 18-halo steroid is dissolved in an unreactive organic solvent, preferably a lower alkanol such as methanol or ethanol and made basic with a solution of an alkali metal hydroxide, preferably potassium hydroxide, dissolved in a lower alkanol solvent such as methanol or ethanol. In carrying out this step of the process advantageously the alkanolic solution of the 18-halo steroid is treated with sufficient alkanolic alkali metal hydroxide, preferably potassium hydroxide, to raise the pH to in the range of from about 10 to 12. The resulting basic solution is then heated at reflux temperature for from 30 minutes to 24 hours. The product is isolated by concentrating the reaction mixture and pouring the concentrate into water. The solution is extracted with chloroform and the washed, dried chloroform extract is evaporated in vacuo to give a residue which crystallizes upon trituration to the solid conanine derivative.

In the above described treatment with alkali, sufficient alkali metal hydroxide is employed to result in the hydrolysis of all acyloxy substituents which may be present to the corresponding hydroxy moiety. It will be appreciated that the reaction conditions employed in this alkali treatment can be varied by those skilled in this art. Thus, the amount of alkali employed can be varied as follows: (a) one equivalent of alkali results in 18→20 pyrrolidine ring closure of the 18-halo steroid intermediate, (b) two or more equivalents of alkali result in ring closure and hydrolysis of one or more acyloxy substituents. Of course, where both an easily removed acyl moiety, such as 3-acyloxy, and a difficultly removed acyl moiety, such as 11- or 5-acyloxy, are present in the steroid nucleus the easily removed acyl moiety is hydrolyzed first. Further, the reaction time can be varied depending on the particular acyloxy substituent and its position in the steroid nucleus. For example, a 3-, 21-, 16- or 6-acyloxy substituent is hydrolyzed in from 30 minutes to two hours, preferably one hour, whereas an 11- or 5-acyloxy substituent requires from 12 to 24 hours for complete hydrolysis. An easily hydrolyzed substituent is the trifluoroacetyl moiety.

If it is desired to retain the acyloxy substituent in the conanine derivative, the resultant hydroxy substituted compounds of FORMULA III are re-acylated. Thus, the residue obtained from evaporation of the chloroform extract following alkali treatment (as described above) is heated at reflux temperature with the appropriate acyl anhydride, for example acetic anhydride, for from one to three hours, preferably two hours. The reaction mixture is poured into water, filtered and the filtrate is made alkaline to from about pH 9 to 11 which is then extracted with chloroform. Evaporation of the washed and dried chloroform extract gives the corresponding acyloxy substituted conanine derivative. Obviously if it is desired to retain the hydroxy moiety obtained by hydrolysis of a corresponding acyloxy moiety, the acylation step is omitted.

In the process of this invention an 11- or 5-acyloxy steroid is employed to give the corresponding 11- or 5-hydroxy conanine derivative as a result of the alkali treatment step of the process. In carrying out this step, the solution of steroid and alkali is refluxed for from 12 to 24 hours.

The novel substituted conanine derivatives now made available for the first time are represented by the following structural formulae. Advantageous are those conanines represented by FORMULAE IV and VI.

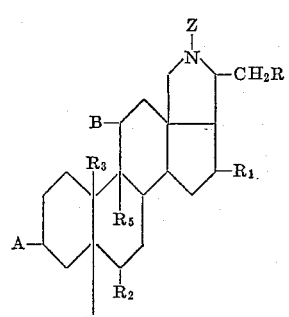

FORMULA IV    FORMULA V

FORMULA VI    FORMULA VII when:

A and B represent hydroxy, acyloxy or keto;
D represents hydroxy or acyloxy;
R and $R_{10}$ represent hydrogen, hydroxy or acyloxy;
$R_1$ represents hydrogen, hydroxy, acyloxy or methyl; preferably hydroxy;
$R_2$ represents hydrogen, fluoro, hydroxy, acyloxy or methyl; preferably hydroxy and fluoro;
$R_3$ represents hydrogen or methyl;
$R_5$ represents hydrogen or fluoro; and
Z represents lower alkyl.

In the above FORMULA V at least one of the substituents R, $R_1$, $R_2$, $R_{10}$ and $R_5$ is other than hydrogen.

Particularly advantageous novel conanines are the 11-oxygenated derivatives of FORMULA IV, especially those when:

A and B represent hydroxy, acyloxy or keto;
R represents hydrogen, hydroxy or acyloxy;
$R_1$, $R_2$, $R_5$ and $R_{10}$ represent hydrogen;
$R_3$ represents hydrogen or methyl, preferably methyl; and
Z represents methyl.

The 20-(N-alkyl-N-haloamino) steroids corresponding to FORMULA I above useful as intermediates in the process for the preparation of conanine derivatives as described above are prepared from the corresponding 20-alkylamino steroids which are obtained from 20-keto steroids by a reductive amination process as disclosed in copending application Serial No. 821,348 filed June 19, 1959. As disclosed, in this process the 20-keto steroid is hydrogenated in the presence of a primary lower alkyl amine dissolved in an unreactive organic solvent such as dioxane, ethanol or methanol, and a hydrogenation catalyst by shaking at a pressure of from 1 to 5 atmospheres of hydrogen at a temperature in the range of from about ambient room temperature or about 25° C. to about 50° C., until the theoretical amount of hydrogen is absorbed, i.e. one molar equivalent. In carrying out this process, advantageously, from 5 to 20 moles excess of the lower alkyl amine is employed and the preferred hydrogenation catalyst is platinum oxide.

The 20-alkylamino steroid is isolated from the reaction mixture by filtering off the catalyst and evaporating the filtrate to dryness. The residue comprises the crude 20α- and 20β-alkylamines. The product is purified advantageously by treatment with acid to remove all non-basic material. For example, the residue is dissolved in a solvent such as ether and hydrogen chloride gas is passed into the solution. The hydrochloride salt is dissolved or suspended in an inert organic solvent such as methylene chloride or methanol and treated with a dilute alkali solution such as an alkali metal hydroxide or carbonate for instance 5% sodium carbonate solution or 10% sodium hydroxide solution. The organic layer containing the free base is dried and evaporated to give a mixture of 20α- and 20β-alkylamines which are separated by fractional recrystallization.

Alternatively, the residual mixture of 20-alkylamines following liberation from the hydrochloride salts as described above are dissolved in ethanol and treated to pH 2 with a saturated ethanolic solution of picric acid. The 20α-alkylamine free base is then isolated from the picrate salt by shaking with ether and 10% sodium hydroxide.

The 20α-alkylamino steroids are also isolated by dissolving the crude reaction product in a solvent such as chloroform and extracting the solution with dilute mineral acid such as hydrochloric acid, or dilute acetic acid. The acid extracts are made basic with dilute alkali to give the solid free base.

In the above described reductive amination process, 20-keto steroids having either an acyloxy or hydroxy moiety substituted in the steroid nucleus are employed satisfactorily. Optionally, in lieu of starting with a hydroxy substituted steroid, the corresponding acyloxy steroid is reductively aminated and the product obtained is converted to the hydroxy steroid. The crude residue of acyloxy steroid after hydrogenation is dissolved in for example ethanol and at least one mole equivalent of potassium hydroxide is added. The solution is heated at reflux for about thirty minutes, cooled, diluted with water and filtered. Recrystallization of the solid thus obtained affords the corresponding hydroxy 20α-alkylamino steroid.

Alternatively, as disclosed in the above-noted copending application, the 20-alkylamino steroids are prepared from the corresponding 5,6-unsaturated 20-keto steroids by reductive amination according to the process described above to give the unsaturated 20-alkylamino steroid which is then hydrogenated to the corresponding saturated derivative by known methods. For example, the 5,6-unsaturated 20-alkylamino steroid is dissolved in acetic acid and hydrogenated under from 1–5 atmospheres of hydrogen in the presence of a suitable catalyst such as palladium.

The 20-alkylamino steroids having a 3-keto moiety are prepared from the corresponding 3-hydroxy derivatives by standard oxidative procedures such as chromic oxide and acetic acid or pyridine.

To prepare the N-haloamino steroids of FORMULA I, the corresponding 20-alkylamino steroid is treated with a halogenating agent such as for example N-chlorosuccinimide, hypochlorous acid, sodium hypochlorite or N-bromosuccinimide, advantageously in an unreactive organic solvent for example chloroform at ambient room temperature or 25° C. for from 30 minutes to three hours, preferably one hour. Advantageously, the halogenating agent is removed and the treatment repeated. Evaporation of the organic solvent yields the N-haloamine. To be useful in the process of this invention the 20-alkylamino steroids having a 5- or 11-hydroxy moiety are converted to the 5- or 11-acyloxy derivatives by acylating with an acyl anhydride, for example acetic anhydride, the corresponding salt of the amino steroid such as the p-toluenesulfonic acid salt and then N-halogenating as described above. For example, a solution of the 5- or 11-hydroxy substituted 20-alkylamino steroid in acetic acid is neutralized exactly with the stoichiometric equivalent amount of p-toluenesulfonic acid and then treated with acetic anhydride at 25° C. for 18 hours or until the desired acetate is formed as determined by polarimetric analysis, or as in the case with a 5-hydroxy moiety the amine salt and anhydride are heated at reflux for 24 hours. The reaction mixture is poured into water, made alkaline in the cold and the resulting acetate filtered. Further, either the readily isolable 20α-alkylamino-allosteroid or the mixture of 20α- and 20β-alkylamino-allo or normal steroids can be used in the preparation of the N-haloamino steroids.

Novel 20-(N-alkyl-N-haloamino) steroids useful as intermediates in the above described process are represented by the following general formula:

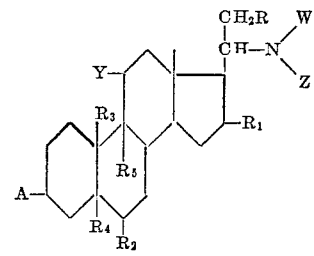

FORMULA VIII when:

A represents hydroxy, acyloxy or keto;
Y represents hydrogen, acyloxy or keto, preferably acyloxy or keto;

R represents hydrogen, hydroxy or acyloxy;
$R_1$ represents hydrogen, hydroxy, acyloxy or methyl;
$R_2$ represents hydrogen, fluoro, hydroxy, acyloxy or methyl;
$R_3$ represents hydrogen or methyl;
$R_4$ represents hydrogen or acyloxy;
$R_5$ represents hydrogen or fluoro;
Z represents lower alkyl; and
W represents halogen of atomic weight less than 80, such as chlorine or bromine, preferably chlorine.

Particularly advantageous novel 20-(N-alkyl-N-haloamino) steroids are represented by FORMULA VIII above when:
$R_1$, $R_2$, $R_4$ and $R_5$ represent hydrogen;
$R_3$ represents hydrogen or methyl, preferably methyl;
Z represents methyl;
W represents chlorine;
Y represents acyloxy or keto; and
A and R are as defined for FORMULA VII.

The conanine derivatives prepared by the novel process of this invention are useful as intermediates in the preparation of 18,20-oxygenated steroids. Particularly useful are the novel substituted conanine derivatives set forth above. The following reaction sequence will serve to illustrate the utility of the conanine derivative. It will be appreciated that in several of the steps outlined where alkali is employed an acyloxy moiety is hydrolyzed to hydroxy which is optionally retained as a hydroxy moiety or acylated again at that point or in the final product.

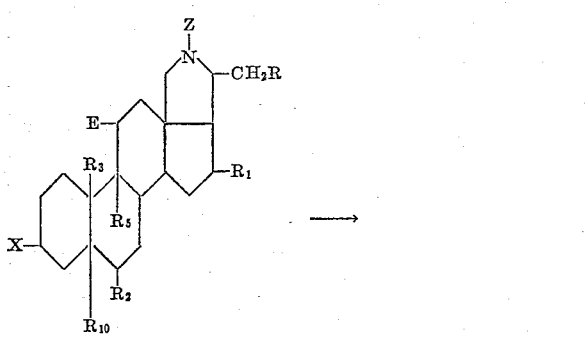

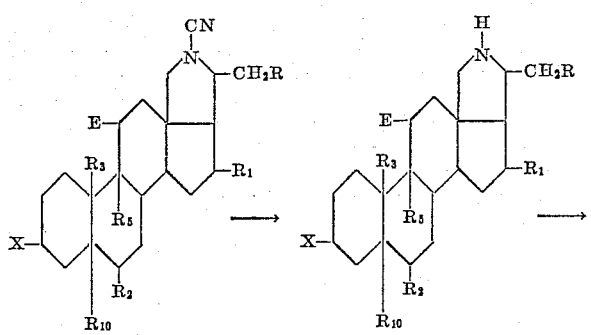

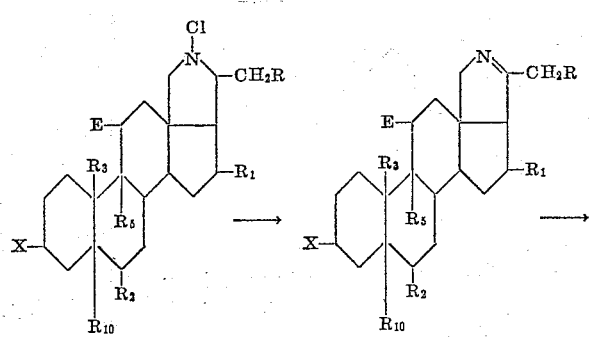

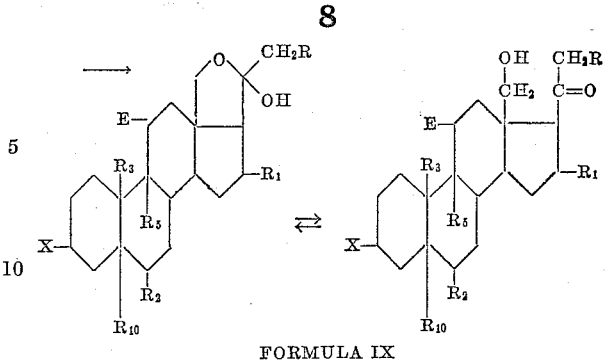

FORMULA IX when:
X and E represent hydrogen, hydroxy, acyloxy or keto;
R and $R_{10}$ represent hydrogen, hydroxy or acyloxy;
$R_1$ represents hydrogen, hydroxy, acyloxy or methyl;
$R_2$ represents hydrogen, fluoro, hydroxy, acyloxy or methyl;
$R_3$ represents hydrogen or methyl;
$R_5$ represents hydrogen or fluoro; and
Z represents lower alkyl.

As outlined above, the N-alkyl conanine derivative is treated with cyanogen bromide to give the N-cyano derivative and the cyano group is removed with alkali such as potassium hydroxide. The free N-hydrogen derivative is treated with a halogenating agent such as N-chlorosuccinimide or sodium hypochlorite to give the N-chloro compound. The latter compound is then dehydrohalogenated with for example a base such as sodium methoxide or methanolic potassium hydroxide and the nitrogen removed from the resulting unsaturated derivative by reaction with nitrous acid to give the 18,20-oxygenated steroid of FORMULA IX.

The following examples will serve to illustrate the utility of certain N-haloamino steroids, the novel process of this invention, the compounds prepared thereby and the utility of these compounds as intermediates in the preparation of the therapeutically valuable 18,20-oxygenated steroid derivatives of FORMULA IX.

*Example 1*

The 20-alkylamino steroids used to prepare the intermediate 20-(N-alkyl-N-haloamino) steroids of FORMULA I are obtained from 20-keto steroids by a reductive amination process as disclosed in copending application Serial No. 821,348 filed June 19, 1959. This process is generally outlined in the above description. The following example will serve to give a specific preparation of a 20-alkylamino steroid according to the process of the above identified copending application.

To a solution of methylamine in 200 ml. of ethanol (11.0–12.0 g. per 100 ml.) is added 18.0 g. of 3β-acetoxy-20-allopregnanone and 0.5 g. of platinum oxide catalyst. The resulting mixture is hydrogenated on the Parr apparatus for six and one-half hours, at which time the theoretical amount of hydrogen is absorbed. The reaction mixture is heated, filtered and the filtrate evaporated to dryness. The residue of crude 20-methylamines is dissolved in ether and hydrogen chloride gas is passed into the solution. The hydrochloride salt is collected and converted to the free amine by taking it up in methylene chloride and washing with 5% sodium carbonate solution and then water. The organic layer is dried and evaporated to give a mixture of 20α- and 20β-methylamines. Recrystallization from acetone yields 3β-acetoxy-20α-methylaminoallopregnane, M.P. 167.5–168.5° C.

*Example 2*

3β-acetoxy-20α-methylaminoallopregnane (27.4 g.) is dissolved in 300 ml. of chloroform and treated with two 500 ml. portions of 5.25% aqueous sodium hypochlorite solution over a 30 minute interval. The organic phase is separated and washed with two 150 ml. portions of water and dried over anhydrous sodium sulfate. Evaporation of chloroform under reduced pressure produces white crystalline 3β-acetoxy-20α-(N-methyl-N-chloroamino)-allopregnane, M.P. ca. 295° C.

To 250 ml. of trifluoroacetic acid cooled to 0° C. is added in small portions 29.9 g. of the above 3β-acetoxy-20α-(N-methyl-N-chloroamino)-allopregnane. The resulting solution is transferred to a flask equipped with a magnetic stirrer and nitrogen is bubbled through for 15 minutes. The oxygen free solution is then irradiated with three G.E. 15 w. Germicidal lamps. Water cooling of the bottom portion of the flask is maintained throughout the irradiation. At the end of each 30 minute interval, 5 drops of reaction solution are removed and added to 5 ml. of 5% potassium iodide-acetone-water solution to determine the qualitative color change (a similar sample is removed before irradiation and treated similarly to produce a dark red color standard). At the end of 130 minutes, the testing procedure produces an almost colorless solution indicating completion of the reaction. The trifluoroacetic acid is removed under vacuum with provisions made for recovering the acid. The residue obtained from this evaporation is treated with 200 ml. of methanol and sufficient 25% potassium-hydroxide methanol solution to raise the pH to 10–12 (150 ml.). The solution is refluxed for one hour on a steam bath. The solution is then concentrated to about 30 ml. and poured into 2400 ml. of water and extracted with 1.5 l. of chloroform. Evaporation of the chloroform under reduced pressure results in a red-gum which when triturated with acetone crystallizes to a solid mass. This solid is recrystallized from 550 ml. of acetone to yield 3β-hydroxyconanine.

Forty grams of 3β-hydroxyconanine and 72 ml. of acetic anhydride are refluxed for two hours. The warm solution is poured into 700 ml. of water and after the anhydride is hydrolyzed, supercel is added and the mixture filtered. The filtrate is made basic and extracted with chloroform. The chloroform extract is washed with sodium carbonate solution and water, dried and evaporated. The residue is recrystallized from acetone to yield 3β-acetoxyconanine, M.P. 164.5–168° C.

*Example 3*

A solution of 10.0 g. of 3β-hydroxy-20α-methylamino-allopregnane in 250 ml. of chloroform is stirred with two 500 ml. portions of 5% sodium hypochlorite solution for 30 minutes. The chloroform layer is separated and washed twice with water. The chloroform solution is dried and evaporated in vacuo to give 3β-hydroxy-20α-(N-methyl-N-chloroamino)-allopregnane.

The N-chloroamine (12.0 g.) is dissolved in 125 ml. of trifluoroacetic acid and the solution irradiated with ultraviolet light under nitrogen atmosphere for one hour. The trifluoroacetic acid is evaporated under vacuum and the residual 3β-hydroxy-18-chloro-20α-methylaminoallopregnane is dissolved in 150 ml. of methanol. Sufficient 25% methanolic potassium hydroxide solution is added to raise the pH to 10–12 and the resulting solution is refluxed for one hour. The solution is concentrated in vacuo, poured into an excess of water and extracted with chloroform. Evaporation of the chloroform extract under reduced pressure yields the residual 3β-hydroxyconanine.

*Example 4*

A solution of 13.3 g. of 3α-hydroxy-20α-methylaminopregnane in 200 ml. of chloroform is stirred with 300 ml. of 5% sodium hypochlorite solution for one-half hour, when the hypochlorite is removed and the treatment is repeated. The chloroform layer is separated, washed with water, dried and evaporated to yield a white amorphous solid, 3α-hydroxy-20α-(N-methyl-N-chloroamino)-pregnane, M.P. 119–123° C.

This chloroamine (8.4 g.) is dissolved in 80 ml. of redistilled trifluoroacetic acid and subjected to ultraviolet irradiation under nitrogen atmosphere for 45 minutes. The trifluoroacetic acid is evaporated in vacuo and the residual oil is dissolved in 200 ml. of methanol made strongly basic with 25% methanolic potassium hydroxide solution. The solution is refluxed for one hour, concentrated in vacuo, poured into 300 ml. of water and extracted with chloroform. The residue of 3α-hydroxy-5β-conanine obtained from evaporation of the washed, dried chloroform solution is boiled for two hours with 20.8 ml. of acetic anhydride, poured into 500 ml. of water and filtered. The clear filtrate is made alkaline in the cold to pH 11 and extracted with chloroform. The chloroform layer is washed with water, dried and evaporated to give a residual oil. A 1.0 g. sample of this residual oil (3α-acetoxy-5β-conanine) is removed, dissolved in ether, and treated with ethereal hydrogen chloride until acid. The white hydrochloride salt precipitates out and is filtered to yield 1.1 g. of salt. The salt is dissolved in a very small volume of alcohol and cooled to yield a crystalline solid which is recrystallized from alcohol-ether to yield 3α-acetoxy-5β-conanine hydrochloride, M.P. 295° C. dec. $[\alpha]_D^{20} +47.4°$ (c.=1.00 chloroform).

*Example 5*

A solution of 12.0 g. of 20α-methylaminoallopregnane in 250 ml. of chloroform is stirred with 250 ml. of 5% sodium hypochlorite solution for one hour, when the hypochlorite is removed and the treatment is repeated. The separated chloroform layer is washed with water, dried and evaporated to give 20α-(N-methyl-N-chloroamino)-allopregnane.

The N-chloroamine prepared above (8.0 g.) is dissolved in 100 ml. of trifluoroacetic acid and irradiated with ultraviolet light under nitrogen atmosphere for one hour. The trifluoroacetic acid is evaporated in vacuo and the residual 18-chloro-20α-methylaminoallopregnane is dissolved in 150 ml. of methanol made strongly basic with 25% methanolic potassium hydroxide solution. The solution is then refluxed for one hour, concentrated in vacuo, poured into water and extracted with chloroform. The washed and dried chloroform extract is evaporated under reduced pressure to give conanine.

*Example 6*

A solution of 20.0 g. of 3β,21-diacetoxy-20α-methylamino-11-allopregnanone in 800 ml. of chloroform and 800 ml. of 5% sodium hypochlorite solution is stirred for one hour, when the hypochlorite is removed and the treatment is repeated. The washed and dried chloroform layer is evaporated in vacuo to yield 3β,21-diacetoxy-20α-(N-methyl-N-chloroamino)-11-allopregnanone.

A solution of the N-chloroamine (16.0 g.) in 250 ml. of trifluoroacetic acid is irradiated with ultraviolet light under nitrogen atmosphere for one hour. The acid is removed in vacuo and the residual 3β,21-diacetoxy-18-chloro-20α-methylamino-11-allopreganone is dissolved in 250 ml. of methanol. This solution is made strongly basic with 25% methanolic potassium hydroxide solution and then refluxed for one hour. The solution is concentrated in vacuo, poured into water and extracted with chloroform. The washed and dried chloroform extract is evaporated to give the residual 3β-21-dihydroxy-11-ketoconanine.

A sample of the above conanine (10.0 g.) and 50 ml. of acetic anhydride are refluxed for two hours. The solution is poured into water and filtered. The filtrate is made alkaline, extracted with chloroform and the washed and dried extract is evaporated to give 3β-21-diacetoxy-11-ketoconanine.

*Example 7*

To a solution of 8.0 g. of 3α-hydroxy-16α-methyl-20α-methylaminopregnan-11-one in 300 ml. of chloroform is added 250 ml. of 5% sodium hypochlorite solution and the mixture is stirred for one hour, when the hypochlorite is removed and the treatment repeated. The separated chloroform layer is washed, dried and evaporated to yield 3α-hydroxy-16α-methyl-20α-(N-methyl-N-chloroamino)-pregnan-11-one.

A solution of 5.0 g. of the N-chloramine in 75 ml. of trifluoroacetic acid is irradiated with ultraviolet light under nitrogen atmosphere for 40 minutes. The trifluoroacetic acid is evaporated in vacuo and a solution of the residual 3α-hydroxy-16α-methyl-18-chloro-20α-methylaminopregnan-11-one in methanol made strongly basic with 25% methanolic potassium hydroxide is refluxed for one hour. The basic solution is then worked up as described in Example 3 to give 3α-hydroxy-16α-methyl-11-keto-5β-conanine.

*Example 8*

A solution of 10.0 g. of 3α,21-dihydroxy-20α-methylaminopregnane in 600 ml. of chloroform is stirred with 600 ml. of 5% sodium hypochlorite solution for one hour, when the hypochlorite is removed and the treatment is repeated. The chloroform layer is separated, washed, dried and evaporated to give 3α,21-dihydroxy-20α-(N-methyl-N-chloroamino)-pregnane.

The above N-chloroamine (7.5 g.) is dissolved in 100 ml. of redistilled trifluoroacetic acid and subjected to ultraviolet irradiation under nitrogen atmosphere for 40 minutes. The trifluoroacetic acid is evaporated in vacuo and the residual 3α,21-dihydroxy-18-chloro-20α-methylaminopregnane is dissolved in 100 ml. of methanol, made strongly basic with 25% methanolic potassium hydroxide solution. The solution is refluxed for one hour and then worked up as in Example 3 to give 3α,21-dihydroxy-5β-conanine.

A sample of the above conanine (2.5 g.) and 15 ml. of acetic anhydride are refluxed for two hours and then the solution is poured into water. The filtered solution is made alkaline, extracted with chloroform and the washed and dried extract is evaporated to yield 3α,21-diacetoxy-5β-conanine.

*Example 9*

A solution of 5.0 g. of 3β,16α-dihydroxy-20α-methylaminoallopregnane in 200 ml. of chloroform is stirred with 200 ml. of 5% sodium hypochlorite solution for one hour. The hypochlorite is removed and the treatment is repeated. The separated chloroform layer is washed, dried and evaporated to yield 3β,16α-dihydroxy-20α-(N-methyl-N-chloroamino)-allopregnane.

A solution of 3.5 g. of the N-chloroamine in 75 ml. of trifluoroacetic acid is irradiated with ultraviolet light under nitrogen atmosphere for 40 minutes. The trifluoroacetic acid is evaporated in vacuo and the residual 3β,16α-dihydroxy-18-chloro-20α-methylaminoallopregnane is dissolved in methanol and treated with alkali as described in Example 3 to yield after final work 3β,16α-dihydroxyconanine.

*Example 10*

A solution of 6.0 g. of 3β,16α-diacetoxy-20α-methylaminoallopregnane is treated with 5% sodium hypochlorite solution and the resulting N-chloroamine is irradiated with ultraviolet light in trifluoroacetic acid according to the directions of Example 9 to yield after alkali treatment 3β,16α-dihydroxyconanine.

The dihydroxyconanine (2.0 g.) and 20 ml. of acetic anhydride are refluxed for two hours. The solution is poured into water, filtered and the filtrate is made alkaline to pH 11. The alkaline solution is extracted with chloroform and the washed and dried extract is evaporated to give 3β,16α-diacetoxyconanine.

*Example 11*

A solution of 10.0 g. of 3α,6β-diacetoxy-20α-methylaminopregnane in 400 ml. of chloroform is stirred with 400 ml. of 5% sodium hypochlorite solution. After one hour the hypochlorite is removed and the treatment is repeated. The separated chloroform layer is water washed, dried and evaporated to give 3α,6β-diacetoxy-20α-(N-methyl-N-chloroamino)-pregnane.

The N-chloramine (7.5 g.) is dissolved in 250 ml. of redistilled trifluoroacetic acid and irradiated with ultraviolet light under nitrogen atmosphere for one hour. The acid is removed in vacuo and the residual 3α,6β-diacetoxy-18-chloro-20α-methylaminopregnane is dissolved in 150 ml. of methanol. The solution is adjusted to pH 10–12 with 25% methanolic potassium hydroxide solution and refluxed for one hour. The reaction mixture is concentrated in vacuo, poured into an excess of water and extracted with chloroform. The extract is washed, dried and evaporated to give the residual 3α,6β-dihydroxy-5β-conanine which is then refluxed for two hours with 35 ml. of acetic anhydride, poured into water and filtered. The filtrate is made alkaline and extracted with chloroform. The chloroform extract is washed with water, dried and evaporated to yield 3α,6β-diacetoxy-5β-conanine.

*Example 12*

A solution of 11.0 g. of 3β-hydroxy-20α-methylamino-19-norallopregnane in 600 ml. of chloroform and 600 ml. of 5% sodium hypochlorite solution is stirred for one hour, when the hypochlorite is removed and the treatment is repeated. The chloroform layer is separated, washed, dried and evaporated to yield 3β-hydroxy-20α-(N-methyl-N-chloroamino)-19-norallopregnane.

A solution of 8.0 g. of the N-chloroamine in 250 ml. of trifluoroacetic acid is irradiated with ultraviolet light under nitrogen atmosphere for one hour. The acid is evaporated in vacuo and the residual 3β-hydroxy-18-chloro-20α-methylamino-19-norallopregnane is dissolved in 150 ml. of methanol, made strongly basic with 25% methanolic potassium hydroxide solution. The basic solution is refluxed for one hour, concentrated in vacuo, poured into water and extracted with chloroform. Evaporation of the washed, dried chloroform extract furnishes 3β-hydroxy-19-norconanine.

Treatment of a sample of the above conanine (2.5 g.) with 15 ml. of acetic anhydride as described in Example 6 yields upon workup the corresponding 3β-acetoxy-19-norconanine.

*Example 13*

A solution of 12.0 g. of 20α-ethylamino-3β-hydroxy-11-allopregnanone in 600 ml. of chloroform is stirred with 600 ml. of 5% sodium hypochlorite solution for one hour, when the hypochlorite is removed and the treatment repeated. Evaporation of the washed and dried chloroform layer yields 20α-(N-ethyl-N-chloroamino)-3β-hydroxy-11-allopregnanone.

The N-chloroamine (10.0 g.) is dissolved in 125 ml. of redistilled trifluoroacetic acid and irradiated with ultraviolet light under nitrogen atmosphere for 40 minutes. The acid is evaporated in vacuo and the residual 18-chloro-20α-ethylamino-3β-hydroxy-11-allopregnanone is dissolved in 150 ml. of methanol. The solution is adjusted to pH 10–12 with 25% methanolic potassium hydroxide solution and heated at reflux for one hour. The reaction mixture is concentrated in vacuo, poured into water and extracted with chloroform. The extract is washed, dried and evaporated to give 3β-hydroxy-11-keto-N-ethylconanine.

*Example 14*

A solution of 10.0 g. of 3β-acetoxy-20α-butylaminoallopregnane in 500 ml. of chloroform is stirred with 500 ml. of 5% sodium hypochlorite solution for one hour. The hypochlorite is then removed and the treatment repeated. The chloroform layer is separated, washed, dried and evaporated to give 3β-acetoxy-20α-(N-butyl-N-chloroamino)-allopregnane.

The N-chloramine (5.0 g.) is dissolved in 75 ml. of trifluoroacetic acid and irradiated with ultraviolet light under nitrogen atmosphere for 40 minutes. The acid is evaporated in vacuo and the residual 3β-acetoxy-18-chloro-20α-butylamino allopregnane is dissolved in 150 ml. of methanol, made strongly basic with 25% methanolic potassium hydroxide solution. The solution is refluxed for one hour, concentrated in vacuo, poured into water and extracted with chloroform. Evaporation of the washed, dried chloroform extract yields 3β-hydroxy-N-butylconanine.

*Example 15*

To a solution of 12.0 g. of 3α-hydroxy-20α-isopropylaminopregnan-11-one in 600 ml. of chloroform is added 600 ml. of 5% sodium hypochlorite solution and the mixture stirred for one hour. The hypochlorite is removed and the treatment is repeated. The chloroform layer is separated, water washed, dried and evaporated to give 3α-hydroxy-20α-(N-isopropyl-N-chloroamino)-pregnan-11-one.

A solution of 11.0 g. of the N-chloroamine in 150 ml. of trifluoroacetic acid is subjected to ultraviolet irradiation under nitrogen atmosphere for 40 minutes. The acid is evaporated under reduced pressure to give the residual 18 - chloro - 3α - hydroxy - 20α - isopropylaminopregnan-11-one. The residue is dissolved in 150 ml. of methanol, made strongly basic with 25% methanolic potassium hydroxide solution, heated at reflux for one hour and then worked up as described in Example 3 to yield 3α-hydroxy-11-keto-5β-N-isopropylconanine.

*Example 16*

A solution of 12.1 g. of 3β-hydroxy-20-methylamino-11-allopregnanone in 600 ml. of chloroform is stirred with 600 ml. of 5% sodium hypochlorite solution for one hour, when the hypochlorite is removed and the treatment is repeated. The chloroform layer is separated, washed with water, dried and evaporated to yield 13.3 g. of colorless solid, 3β-hydroxy-20-(N-methyl-N-chloroamino)-11-allopregnanone.

The N-chloroamine is dissolved in 130 ml. of redistilled trifluoroacetic acid and subjected to ultraviolet irradiation under nitrogen atmosphere for 40 minutes. The trifluoroacetic acid is evaporated in vacuo and the desidual 3β - hydroxy-18-chloro-20-methylamino-11-allopregnanone is dissolved in 150 ml. of methanol, made strongly basic with 25% methanolic potassium hydroxide solution and refluxed for one hour. The solution is concentrated in vacuo, poured into 1000 ml. of water and extracted with chloroform. The residue of 3β-hydroxy-11-ketoconanine obtained from evaporation of the washed, dried chloroform solution is boiled for two hours with 25 ml. of acetic anhydride, poured into 500 ml. of water and filtered. The clear filtrate is made alkaline in the cold to pH 11 and extracted with chloroform. The chloroform layer is washed with water, dried and evaporated to give 3β-acetoxy-11-ketoconanine. Recrystallization from ethanol affords colorless needles, M.P. 186–189° C., $[\alpha]_D^{25}+83.0°$ (c.=1.00).

*Example 17*

A solution of 6.0 g. of 3α-hydroxy-20-methylaminopregnan-11-one in 300 ml. of chloroform is stirred with 300 ml. of 5% sodium hypochlorite solution for one hour. The hypochlorite is removed and the treatment repeated. The chloroform layer is separated, washed with water, dried and evaporated to give 3α-hydroxy-20-(N-methyl-N-chloroamino)-pregnan-11-one..

The above N-chloroamine (6.6 g.) is dissolved in 65 ml. of redistilled trifluoroacetic acid and irradiated with ultraviolet light under nitrogen for 40 minutes. The trifluoroacetic acid is evaporated in vacuo and the residual 3α-hydroxy-18-chloro-20-methylaminopregnan-11-one is dissolved in 75 ml. of methanol, made strongly basic with 25% methanolic potassium hydroxide. The solution is refluxed for one hour, concentrated in vacuo, poured into 500 ml. of water and extracted with chloroform. The chloroform extract is washed, dried and evaporated. The residue of 3α-hydroxy-11-keto-5β-conanine is boiled for two hours with 12.5 ml. of acetic anhydride, poured into 250 ml. of water and filtered. The filtrate is adjusted to pH 11 and extracted with chloroform. The extract is washed, dried and evaporated to give 3α-acetoxy-11-keto-5β-conanine.

*Example 18*

A solution of 10.0 g. of 3α-11β,-dihydroxy-20α-methylaminopregnane in 100 ml. of acetic acid is neutralized with an exact stoichiometric equivalent amount of p-toluenesulfonic acid. An additional 1.0 g. of p-toluenesulfonic acid is then added, followed by 20 ml. of acetic anhydride and the resulting solution is allowed to stand at 25° C. for 18 hours. The reaction mixture is poured into 500 ml. of water, made alkaline in the cold, and the resulting 3α,11β-diacetoxy-20α-methylaminopregnane is filtered. The diacetoxy pregnane is dissolved in 500 ml. of chloroform and stirred with 500 ml. of 5% sodium hypochlorite solution for one hour, when the hypochlorite is removed and the treatment is repeated. The chloroform layer is separated, washed, dried and evaporated to give 3α,11β-diacetoxy-20α-(N-methyl-N-chloroamino)-pregnane.

The diacetoxy N-chloroamine (5.0 g.) is dissolved in 75 ml. of trifluoroacetic acid and irradiated with ultraviolet light under nitrogen atmosphere for 40 minutes. The acid is evaporated in vacuo and the residual 3α,11β-diacetoxy-18-chloro - 20α - methylaminopregnane is dissolved in 125 ml. of methanol. Sufficient 25% methanolic potassium hydroxide solution is added to raise the pH to 11 and the basic solution is then refluxed for 18 hours. The reaction mixture is concentrated in vacuo, poured into water and extracted with chloroform. The chloroform extract is washed, dried and evaporated to give 3α,11β-dihydroxy-5β-conanine.

*Example 19*

A solution of 12.0 g. of 3β,11α-dihydroxy-20α-methylaminoallopregnane in 120 ml. of acetic acid is neutralized with an exact stoichiometric equivalent amount of p-toluenesulfonic acid. An additional 1.2 g. of p-toluenesulfonic acid is added, followed by 20 ml. of acetic anhydride and the solution is allowed to stand at 25° C. until a maximum of the desired diacetate is formed as determined by polarimetric analysis. The reaction mixture is poured into 500 ml. of water, made alkaline in the cold and the resulting 3β,11α-diacetoxy-20α-methylaminoallopregnane is filtered. The diacetoxy pregnane is dissolved in 600 ml. of chloroform and stirred with 500 ml. of 5% sodium hypochlorite solution for one hour, when the hypochlorite is removed and the treatment repeated. The chloroform layer is separated, washed, dried and evaporated to give 3β, 11α-diacetoxy-20α-(N-methyl-N-chloroamino)-allopregnane.

The diacetoxy N-chloroamine (5.0 g.) is dissolved in 75 ml. of trifluoroacetic acid and irradiated with ultraviolet light under nitrogen atmosphere and at −20° C. just until the reaction is completed as determined by the qualitative color change of a 5% potassium iodide-acetone-water solution. The solution is then poured into sufficient 10% methanolic potassium hydroxide solution at 20° C. to neutralize the trifluoroacetic acid. To the neutral solution, 75 ml. of methanol is added and the pH adjusted to 11 by the addition of 25% methanolic potassium hydroxide solution. The solution is refluxed for 60 minutes, concentrated in vacuo, poured into water and extracted with chloroform. The chloroform extract is washed with water, dried and evaporated to yield 11α,3β-dihydroxyconanine.

*Example 20*

A solution of 5.0 g. of 3α,11α-diacetoxy-20α-methyl aminopregnane in 300 ml. of chloroform is stirred with 300 ml. of 5% sodium hypochlorite solution for one hour. The hypochlorite is removed and the treatment repeated.

The chloroform layer is separated, washed, dried and evaporated to yield 3α,11α-diacetoxy-20α-(N-methyl-N-chloroamino)-pregnane.

The N-chloroamine (2.5 g.) is dissolved in 50 ml. of trifluoroacetic acid and irradiated with ultraviolet light under nitrogen atmosphere for 40 minutes. The acid is evaporated in vacuo and the residual 3α,11α-diacetoxy-18-chloro-20α-methylaminopregnane is dissolved in 125 ml. of methanol, adjusted to pH 11 to 12 with 25% methanolic potassium hydroxide solution. The solution is refluxed for 24 hours, concentrated in vacuo, poured into water and extracted with chloroform. The washed and dried extract is evaporated to give 3α,11α-dihydroxy-5β-conanine.

*Example 21*

A solution of 10.0 g. of 3β,5α,6β-trihydroxy-20-methylaminoallopregnane in 100 ml. of acetic acid is neutralized with an exact stoichiometric equivalent amount of p-toluenesulfonic acid. An additional 1.0 g. of p-toluenesulfonic acid is added, followed by 45 ml. of acetic anhydride and the resulting solution is refluxed for 24 hours. Following the directions of Example 18, the reaction mixture is worked up to give 3β,5α,6β-triacetoxy-20-methylaminoallopregnane which is similarly treated in chloroform solution with 500 ml. of 5% sodium hypochloride solution to yield after final workup 3β,5α,6β-triacetoxy-20-(N-methyl-N-chloroamino)-allopregnane.

The triacetoxy N-chloroamine (8.0 g.) is dissolved in 130 ml. of trifluoroacetic acid and subjected to ultraviolet irradiation under nitrogen atmosphere for 40 minutes. The acid is evaporated in vacuo and the residual 3β,5α,6β-triacetoxy-18-chloro-20-methylaminoallopregnane is dissolved in 150 ml. of methanol, made strongly basic with 25% methanolic potassium hydroxide solution. The basic solution is refluxed for 18 hours, concentrated in vacuo, poured into water and extracted with chloroform. The extract is washed, dried and evaporated to yield 3β,5α,6β-trihydroxyconanine.

*Example 22*

A solution of 11.0 g. 3β,5α-diacetoxy-6β-methyl-20α-methylamino-11-allopregnanone in 600 ml. of chloroform is stirred with 600 ml. of 5% sodium hypochlorite solution for one hour, when the hypochlorite is removed and the treatment is repeated. The separated chloroform layer is washed with water, dried and evaporated to yield 3β,5α-diacetoxy-6β-methyl-20α-(N-methyl-N-chloroamino)-11-allopregnanone.

The N-chloroamine (3.0 g.) is dissolved in 50 ml. of trifluoroacetic acid and irradiated with ultraviolet light under nitrogen atmosphere for 40 minutes. The acid is evaporated in vacuo and the residual 3β,5α-diacetoxy-6β-methyl-18-chloro-20α-methylamino-11-allopregnanone is dissolved in 100 ml. of methanol, adjusted to pH 10–11 with 25% methanolic potassium hydroxide solution. The basic solution is heated at reflux for 30 minutes, concentrated in vacuo, poured into water and extracted with chloroform. The washed and dried chloroform extract is evaporated to yield 5α-acetoxy-3β-hydroxy-6β-methyl-11-ketoconanine.

*Example 23*

A solution of 5.0 g. of 3β,5α-dihydroxy-6β-methyl-20α-methylamino-19-norallopregnane in 50 ml. of acetic acid is neutralized with an exact stoichiometric equivalent amount of p-toluenesulfonic acid. An additional 0.6 g. of p-toluenesulfonic acid is added, followed by 50 ml. of acetic anhydride and the solution is refluxed for 24 hours. Following the directions of Example 18, the reaction mixture is worked up to give 3β,5α-diacetoxy-6β-methyl-20α-methylamino-19-norallopregnane which is similarly treated in chloroform solution with 5% sodium hypochlorite solution to yield upon workup 3β,5α-diacetoxy-6β-methyl-20α-(N-methyl-N-chloroamino)-19-norallopregnane.

The diacetoxy N-chloroamine (2.0 g.) is dissolved in 50 ml. of trifluoroacetic acid and irradiated with ultraviolet light under nitrogen atmosphere for 40 minutes. The acid is evaporated in vacuo and the residual 3β,5α-diacetoxy-6β-methyl-18-chloro-20α-methylamino-19-norallopregnane is dissolved in 100 ml. of methanol, made strongly basic with 25% methanolic potassium hydroxide solution. The basic solution is refluxed for 18 hours, concentrated in vacuo, poured into water and extracted with chloroform. The chloroform extract is washed, dried and evaporated to yield 3β,5α-dihydroxy-6β-methyl-19-norconanine.

*Example 24*

A solution of 7.0 g. of 6β-methyl-20α-methylamino-3β,5α,11α-trihydroxyallopregnane in 75 ml. of acetic acid is neutralized with an exact stoichiometric equivalent amount of p-toluenesulfonic acid. An additional 0.6 g. of p-toluenesulfonic acid is added, followed by 20 ml. of acetic anhydride and the solution is allowed to stand at 25° C. until a maximum of the triacetate is formed as indicated by polarimetric analysis. Following the directions of Example 19, the reaction mixture is worked up to give 6β-methyl-20α-methylamino-3β,5α,11α-triacetoxyallopregnane which is similarly treated in chloroform solution with 300 ml. of 5% sodium hypochlorite solution to give 6β-methyl-20α-(N-methyl-N-chloroamino)-3β,5α,11α-triacetoxyallopregnane.

The triacetoxy N-chloroamine (2.5 g.) is dissolved in 50 ml. of trifluoroacetic acid and irradiated with ultraviolet light under nitrogen atmosphere and at −20° C. just until the reaction is completed as determined by the qualitative color change of a 5% potassium iodide-acetone-water solution. The solution is then poured into sufficient 10% methanolic potassium hydroxide solution at 20° C. to neutralize the trifluoroacetic acid. To the neutral solution is added 75 ml. of methanol and the pH adjusted to 11–12 with 25% methanolic potassium hydroxide solution. The basic solution is refluxed for 24 hours and worked up as described in Example 19 to yield 6β-methyl-3β,5α,11α-trihydroxyconanine.

*Example 25*

A solution of 5.0 g. of 3β,5α-dihydroxy-6β-methyl-20α-methylaminoallopregnane in 50 ml. of acetic acid is neutralized with an exact stoichiometric equivalent amount of p-toluenesulfonic acid. An additional 0.6 g. of p-toluenesulfonic acid is added, followed by 25 ml. of acetic anhydride and the solution is refluxed for 24 hours. Following the directions of Example 18, the reaction mixture is worked up to give 3β,5α-diacetoxy-6β-methyl-20α-methylaminoallopregnane which is similarly treated in chloroform solution with 300 ml. of 5% sodium hypochlorite solution to yield 3β,5α-diacetoxy-6β-methyl-20α-(N-methyl-N-chloroamino)-allopregnane.

The diacetoxy N-chloroamine (2.0 g.) is dissolved in 50 ml. of trifluoroacetic acid and irradiated with ultraviolet light under nitrogen atmosphere for 40 minutes. The acid is removed in vacuo and the residual 18-chloro-3β,5α-diacetoxy-6β-methyl-20α-methylaminoallopregnane is dissolved in 125 ml. of methanol, adjusted to pH 11 with 25% methanolic potassium hydroxide solution. The solution is refluxed for 30 minutes, concentrated in vacuo, poured into water and extracted with chloroform. The residue of 5α-acetoxy-3β-hydroxy-6β-methylconanine obtained from evaporation of the washed, dried chloroform extract is boiled for two hours with 15 ml. of acetic anhydride, poured into water and filtered. The filtrate is made alkaline, extracted with chloroform and the washed, dried extract is evaporated to yield 3β,5α-diacetoxy-6β-methylconanine.

*Example 26*

To 3.6 g. of 3α-hydroxy-16α-methyl-20α-methylaminopregnan-11-one in 40 ml. of glacial acetic acid is added 1.0 g. of chromic oxide in 6 ml. of 50% acetic acid and the mixture is heated at 65° C. for one hour. The reaction solution is diluted with water, made basic with dilute sodium hydroxide solution and extracted with chloroform. The chloroform extract is washed with water, dried, filtered and evaporated to give 16α-methyl-20α-methylamino-5β-pregnan-3,11-dione.

A solution of 12.0 g. of the pregnandione in 600 ml. of chloroform is stirred with 600 ml. of 5% sodium hypochlorite solution for one hour, when the hypochlorite is removed and the treatment repeated. The separated chloroform layer is washed, dried and evaporated to give 16α-methyl-20α-(N-methyl-N-chloroamino)-5β-pregnan-3,11-dione.

A solution of 3.0 g. of the N-chloroamine in 60 ml. of trifluoroacetic acid is irradiated with ultraviolet light under nitrogen atmosphere for 40 minutes. The acid is evaporated in vacuo and a solution of the residual 16α-methyl-18-chloro-20α-methylamino-5β-pregnan-3,11-dione in methanol made strongly basic with 25% methanolic potassium hydroxide solution is heated at reflux for one hour. Working up as described in Example 3 yields 3,11-diketo-16α-methyl-5β-conanine.

Example 27

To 1.0 g. of 3β-hydroxy-20α-methylamino-19-norallopregnane in 10 ml. of glacial acetic acid is added 0.3 g. of chromic oxide in 2 ml. of 50% acetic acid and the mixture is heated at 65° C. for one hour. The diluted reaction mixture is made basic with sodium hydroxide solution and extracted with chloroform. The washed and dried extract is filtered and evaporated to give 20α-methylamino-19-nor-3-allopregnanone.

A solution of the allopregnanone (10.0 g.) in 400 ml. of chloroform is treated with 5% sodium hypochlorite solution as described in Example 4 to yield 20α-(N-methyl-N-chloroamino)-19-nor-3-allopregnanone.

The N-chloroamine (6.0 g.) dissolved in 150 ml. of trifluoroacetic acid is irradiated with ultraviolet light under nitrogen atmosphere for one hour. The acid is evaporated in vacuo and the residual 18-chloro-20α-methylamino-19-nor-3-allopregnanone is dissolved in 100 ml. of methanol, made strongly basic with 25% methanolic potassium hydroxide solution. The basic solution is heated for one hour and treated as described in Example 3 to give 3-keto-19-norconanine.

Example 28

To 10.0 g. of 3β-hydroxy-20-methylamino-11-allopregnanone in 100 ml. of glacial acetic acid is added 3.0 g. of chromic oxide in 20 ml. of 50% acetic acid and the mixture is heated at 65° C. for one hour. Working up the reaction mixture as in Example 26 yields 20-methylamino-3,11-allopregnandione.

A solution of 8.0 g. of the allopregnandione in 300 ml. of chloroform is treated with 5% sodium hypochlorite solution as described in Example 4 to give 20-(N-methyl-N-chloroamino)-3,11-allopregnandione.

The N-chloroamine (5.0 g.) is dissolved in 75 ml. of trifluoroacetic acid and the solution irradiated with ultraviolet light under nitrogen atmosphere for one hour. The acid is evaporated in vacuo and the residual 18-chloro-20-methylamino-3,11-allopregnandione is dissolved in 100 ml. of methanol, made strongly basic with 25% methanolic potassium hydroxide solution. The basic solution is heated at reflux for one hour and worked up as described in Example 3 to give 3,11-diketoconanine.

Example 29

To 1.1 g. of 3β-hydroxy-5α-acetoxy-6β-methyl-20α-methylamino-19-norallopregnane (prepared from 3β,5α-dihydroxy-6β-methyl-20α-methylamino-19-norallopregnane by acetylating with acetic anhydride at reflux for 24 hours and hydrolyzing the resulting diacetoxy steroid with one equivalent of alkali at reflux for 30 minutes) in 10 ml. of glacial acetic acid is added 0.23 g. of chromic oxide in 2 ml. of 50% acetic acid and the mixture is heated at 65° C. for one hour. Treating the reaction mixture as outlined in Example 26 yields 5α-acetoxy-6β-methyl-20α-methylamino-19-nor-3-allopregnanone.

A solution of 2.5 g. of the allopregnanone in 150 ml. of chloroform is stirred with 200 ml. of 5% sodium hypochlorite solution for one hour, when the hypochlorite is removed and the treatment repeated. The separated chloroform layer is washed with water, dried and evaporated to yield 5α-acetoxy-6β-methyl-20α-(N-methyl-N-chloroamino)-19-nor-3-allopregnanone.

The acetoxy N-chloroamine (2.0 g.) is dissolved in 50 ml. of trifluoroacetic acid and irradiated with ultraviolet light under nitrogen atmosphere for 40 minutes. The acid is evaporated in vacuo and the residual 5α-acetoxy-6β-methyl-18-chloro-20α-methylamino-19-nor-3-allopregnanone is dissolved in 50 ml. of methanol. The solution is adjusted to pH 10–11 with 25% methanolic potassium hydroxide solution and then refluxed for 30 minutes. The reaction mixture is concentrated in vacuo, poured into water and extracted with chloroform. The extract is washed, dried and evaporated to yield 5α-acetoxy-6β-methyl-3-keto-19-nor-conanine.

Example 30

To 1.0 g. of 3β-hydroxy-20α-methylaminoallopregnane in 10 ml. of glacial acetic acid is added 0.23 g. of chromic oxide in 2 ml. of 50% acetic acid and the mixture is heated at 65° C. for one hour. The solution is diluted with water, made basic with sodium hydroxide solution and extracted with chloroform. The extract is washed with water, dried, filtered and evaporated to give 20α-methylamino-3-allopregnanone.

A solution of the allopregnanone (5.0 g.) in 200 ml. of chloroform is treated with 5% sodium hypochlorite solution as described in Example 4 to yield 20α-(N-methyl-N-chloroamino)-3-allopregnanone.

The N-chloroamine (2.0 g.) dissolved in 30 ml. of trifluoroacetic acid is irradiated with ultraviolet light as described in Example 3 to give the intermediate 18-chloro-20α-methylamino-3-allopregnanone which is similarly treated with alkali to yield upon final workup 3-ketoconanine.

Example 31

To a solution of 6.3 g. of 3β-acetoxy-11-ketoconanine (prepared as in Example 16) in 600 ml. of ether is added under exclusion of moisture a dry solution of 6.3 g. of cyanogen bromide in 100 ml. of ether and the reaction is maintained at 27° C. for 90 hours. The ether is boiled off and the residue is dissolved in 20 ml. of water and extracted into chloroform. The chloroform extract is washed with water, 10% sodium hydroxide solution and water, dried and evaporated. The residue is recrystallized from ethyl acetate to give 3β-acetoxy-11-keto-N-cyanonorconanine as colorless prisms, M.P. 218–220° C., $[\alpha]_D^{25} + 104°$ (c.=1.00 in chloroform).

A solution of 3.5 g. of 3β-acetoxy-11-keto-N-cyanonorconanine in 75 ml. of 95% alcohol containing 11.0 g. of potassium hydroxide is boiled for 40 hours and poured into 800 ml. of water. The product is extracted into chloroform and the chloroform solution stirred with two 100 ml. portions of 5% sodium hypochlorite solution, each time for 30 minutes. The residue from evaporation of the washed dried chloroform layer is treated with methanol and then recrystallized from aqueous methanol to give 3β-hydroxy-11-keto-N-chloronorconanine as colorless needles, M.P. 270° C. dec., $[\alpha]_D^{25} + 98.9°$ (c.=1.00 in chloroform).

A solution of 5.0 g. of potassium hydroxide and 2.0 g. of 3β-hydroxy-11-keto-N-chloronorconanine in 25 ml. of methanol is boiled under reflux for one hour, poured into 500 ml. of water and extracted with chloroform. The washed, dried chloroform solution is evaporated to give 3β-hydroxy-11-keto-$\Delta^{20,N}$-18,20-iminoallopregnane which is recrystallized from ethyl acetate to give yellow prisms, M.P. 238–241° C., $[\alpha]_D^{25}+61.7°$ (c.=1.00 in chloroform).

A stirred solution of 1.0 g. of 3β-hydroxy-11-keto-$\Delta^{20,N}$-18,20-iminoallopregnane in 2 ml. of glacial acetic acid and 9 ml. of water is treated dropwise at 0° C. with a solution of 0.5 g. of sodium nitrite in 2 ml. of water. Nitrogen evolves and the mixture is allowed to stand for 18 hours at 27° C. The solid precipitate is filtered and recrystallized from ethyl acetate and then aqueous acetone to yield colorless crystals of 3β,18-dihydroxy-11,20-allopregnanedione, M.P. 110–115° C., 200° C. The dihydroxydione is in equilibrium with the corresponding 18,20-hemiketal structure.

*Example 32*

To a solution of 6.3 g. of 3α-acetoxy-11-keto-5β-conanine (prepared as in Example 17) in 600 ml. of ether is added in a moisture free atmosphere a dry solution of 6.3 g. of cyanogen bromide in 100 ml. of ether. The mixture is maintained at 27° C. for 90 hours and then the ether is boiled off. The residue is dissolved in 20 ml. of glacial acetic acid, diluted with 200 ml. of water and extracted into chloroform. The extract is washed successively with water, 10% sodium hydroxide and water, and then dried and evaporated. The residue is recrystallized to give 3α-acetoxy-11-keto-5β-N-cyanonorconanine.

A solution of 7.0 g. of the above conanine derivative in 150 ml. of 95% alcohol containing 22.0 g. of potassium hydroxide is boiled for 40 hours and then poured into 1.5 l. of water. The mixture is extracted with chloroform and the extract is stirred with two 200 ml. portions of 5% sodium hypochlorite solution, each time for 30 minutes. The chloroform layer is washed, dried and evaporated to give the residual 3α-hydroxy-11-keto-5β-N-chloronorconanine.

A solution of 2.5 g. of potassium hydroxide and 1.0 g. of 3α-hydroxy-11-keto-5β-N-chloroconanine in 15 ml. of methanol is refluxed for one hour. The reaction mixture is poured into 250 ml. of water and extracted with chloroform. The washed, dried chloroform extract is evaporated to give 3α-hydroxy-11-keto-$\Delta^{20,N}$-18,20-iminopregnane.

A solution of 2.0 g. of 3α-hydroxy-11-keto-$\Delta^{20,N}$-18,20-iminopregnane in 4 ml. of glacial acetic acid and 18 ml. of water is stirred and treated dropwise at 0° C. with a solution of 1.0 g. of sodium nitrite in 4 ml. of water. The mixture is allowed to stand for 18 hours at 27° C. The solid precipitate is filtered and recrystallized to yield 3α,18-dihydroxypregnan-11,20-dione which is in equilibrium with the corresponding 18,20-hemiketal.

*Example 33*

A solution of 25.0 g. of 3β-acetoxyconanine (prepared as in Example 2) and 26.0 g. of cyanogen bromide in 1500 ml. of ether is allowed to stand at room temperature for four days. The mixture is filtered to remove 4.0 g. of 3-acetoxyconanine methobromide. The ether filtrate is extracted with dilute acetic acid to remove a small amount of unreacted starting material. After washing the ether solution with sodium carbonate solution and drying, the solvent is removed and the residue recrystallized from ethyl acetate to yield 3β-acetoxy-N-cyanonorconanine, M.P. 178–181.5° C.

Ten grams of 3β-acetoxy-N-cyanonorconanine and 105 g. of potassium hydroxide in 700 ml. of alcohol are refluxed for 48 hours. The solution is diluted with several volumes of water and the solid collected. Recrystallization of the solid from acetone gives 3β-hydroxynorconanine, M.P. 169–172° C.

A chloroform solution of the above prepared 3β-hydroxynorconanine is stirred with 100 ml. of 5% sodium hypochlorite for one-half hour, when the hypochlorite is removed and the treatment is repeated. The chloroform layer is separated, washed with water, dried and evaporated to yield a residual syrup. The residual syrup is crystallized from 15 ml. of acetonitrile to give 3β-hydroxy-N-chloronorconanine as colorless needles which after recrystallization melts at 111–114° C., resolidifies M.P. 268° C. dec., $[\alpha]_D^{25}+96.8°$ (c.=1.00 chloroform).

3β-hydroxy-N-chloronorconanine, prepared from 7.2 methoxide in 500 ml. of methanol are refluxed for about one hour. The solution is concentrated in vacuo, diluted with water and extracted into chloroform. The chloroform solution is washed, dried and evaporated and the residue is recrystallized from acetone to give the product, 3β-hydroxy-$\Delta^{20,N}$-18,20-iminoallopregnane, M.P. 180–182.5° C.

A stirred solution of 2.0 g. of 3β-hydroxy-$\Delta^{20,N}$-18,20-iminoallopregnane in 4 ml. of glacial acetic acid and 18 ml. of water is treated dropwise at 0° C. with a solution of 1.0 g. of sodium nitrite in 4 ml. of water. Nitrogen evolves and the mixture is allowed to stand for 18 hours at 27° C. The precipitate is filtered and recrystallized to give 3β,18-dihydroxy-20-allopregnanone which is in equilibrium with the corresponding 18,20-hemiketal.

*Example 34*

To a solution of 6.1 g. of 3α-acetoxy-5β-conanine (prepared as in Example 4) in 600 ml. of ether is added under exclusion of moisture a dry solution of 6.1 g. of cyanogen bromide in 100 ml. of ether. The reaction is maintained at 27° C. for 90 hours. The ether is removed and the residue is dissolved in 20 ml. of glacial acetic acid, diluted with 200 ml. of water and extracted into chloroform. The chloroform extract is washed with water, 10% sodium hydroxide solution and water, dried, and evaporated to give 3α-acetoxy-5β-N-cyanonorconanine.

The cyanonorconanine (6.2 g.) is dissolved in 150 ml. of alcohol containing 19.5 g. of potassium hydroxide and refluxed for 40 hours. The cooled solution is poured into one liter of water and extracted with chloroform. The chloroform layer is separated and washed with water until neutral.

The washed chloroform solution containing the 3α-hydroxy-5β-N-norconanine is stirred with 200 ml. of 5% sodium hypochlorite for one-half hour, when the hypochlorite is removed and the treatment is repeated. The chloroform layer is separated, washed with water, dried and evaporated to yield 7.3 g. of a yellow oil. The oil is dissolved in 75 ml. of methanol and treated with 25% methanolic potassium hydroxide until strongly alkaline. After refluxing for one hour, the solution is concentrated and poured into 400 ml. of water, extracted with chloroform, washed, and dried over sodium sulfate. Evaporation of the chloroform in vacuo produces an oil which crystallizes upon trituration with acetone to yield 3α-hydroxy-$\Delta^{20,N}$-18,20-iminopregnane, M.P. 218–224° C.

A solution of 1.0 g. of the above iminopregnane in 2 ml. of glacial acetic acid and 9 ml. of water is stirred and a solution of 0.5 g. of sodium nitrite in 2 ml. of water is added dropwise at 0° C. The mixture is allowed to stand at room temperature for 18 hours and the precipitate is filtered to give the product, 3α,18-dihydroxypregnan-20-one. The product exists in equilibrium with the corresponding 3α,20-dihydroxypregnan-18,20-hemiketal.

*Example 35*

A solution of 5 g. of 3β-acetoxy-9(11)-allopregnen-20-one [J. Org. Chem., 16, 1278 (1951)] in 500 ml. of dioxane and 75 ml. of water is treated with N-bromoacetamide and 77 ml. of 1.5% aqueous perchloric acid. After 20 minutes at 27° C., the excess N-bromoacetamide is destroyed with aqueous sodium pyrosulfite. The pH is adjusted to 11. The resulting solution is allowed to stand for 30 minutes, then acidified with glacial acetic acid and evaporated in vacuo. When the dioxane is off the reaction mixture, the residue is diluted with water. The crude product is collected and acetylated with pyridine and acetic anhydride at 100° C. The cooled mixture is poured into water. The solid is collected and recrystallized to give 3β-acetoxy-9β,11β-epoxy-allopregnan-20-one. The compound (5 g.) in 500 ml. of chloroform and 25 ml. of ethanol is mixed with 6 g. of anhydrous hydrogen fluoride. After standing at ambient temperature for 6 hours, the reaction mixture is poured into 5% sodium bicarbonate. The product is extracted into chloroform to give 3β-acetoxy-9α-fluoro-allopregnan-11β-ol-20-one. This compound (3 g.) in 100 ml. of acetic acid is oxidized with 1 g. of chromic acid for 1 hour at 27° C. The solution is quenched and extracted with chloroform to give the 11-one. This compound (2.8 g.) in 75 ml. of ethanol containing 10% w./w. of methylamine is shaken under hydrogen with 200 mg. of platinum oxide until the theoretical amount of hydrogen is absorbed. The mixture is diluted with ethanol, filtered and the filtrate evaporated to leave the 20-methylamino compound. This compound (13 g.) in 200 ml. of chloroform is stirred with 300 ml. of 5% sodium hypochlorite solution for 30 minutes. The chloroform layer is separated, washed and evaporated to leave 3β-acetoxy-9α-fluoro-11-keto-20α-(N-methyl-N-chloroamino)-allopregnane. The chloroamine (8.4 g.) is dissolved in 80 ml. of trifluoroacetic acid and irradiated for 45 minutes. The solvent is evaporated and the residual 18-chloro intermediate is taken up in methanol, made basic with methanolic potassium hydroxide and heated at reflux for one hour. The chloroform extracted residue is taken to dryness to give 3β-hydroxy-9α-fluoro-11-keto-conanine.

*Example 36*

A solution of 0.2 mole of 6α,9α-difluoro-4-pregnen-3,11,20-trione (U.S. Patent No. 2,880,205) in 750 ml. of methanol with 2 g. of 5% palladium-on-charcoal is hydrogenated at low pressure and ambient temperature until one molar equivalent of hydrogen is absorbed. The catalyst is removed and solvent evaporated. The residue is purified by chromatography to give 6α,9α-difluoro-3,11,20-allopregnantrione. This compound (0.17 mole) in 4.5 l. of methanol is mixed over a period of 10 minutes with a mixture of 1.5 l. of methanol, 50 ml. of 2.5 N sodium hydroxide solution and 1.8 l. of 0.18 molar sodium borohydride in pyridine. The mixture is diluted with an excess of concentrated hydrochloric acid then extracted into ether. The ether extracts are washed, dried and evaporated to leave 6α,9α-difluoro-3β-hydroxy-11,20-allopregnandione. A suspension of 20 g. of the dione in 450 ml. of ethanol containing about 25 g. of methylamine is hydrogenated with platinum oxide catalyst until one mole of hydrogen is absorbed to give upon workup 6α,9α-difluoro-3β-hydroxy-20-methylamino-11-allopregnanone. This compound (12 g.) in chloroform is reacted with 500 ml. of 5% sodium hypochlorite solution to give the chloroamine which is irradiated in 45 ml. of trifluoroacetic acid. The intermediate 18-chloro compound is refluxed for two hours with 25% methanolic potassium hydroxide to give 6α,9α-difluoro-3β-hydroxy-11-ketoconanine.

*Example 37*

A solution of 3.5 g. of 6α-fluoro-4-pregnen-3,11,20-trione (U.S. Patent No. 2,838,501) in 75 ml. of methanol and 0.1 g. of 5% palladium-on-charcoal is hydrogenated at low pressure and room temperature until one mole of hydrogen is absorbed. The catalyst is removed and the solvent evaporated. The residue is purified by chromatography to give 6α-fluoro-3,11,20-allopregnantrione. A solution of 5.9 g. of the trione in 500 ml. of methanol is mixed over a period of 10 minutes with a mixture of 150 ml. of methanol, 1 ml. of 2.5 N sodium hydroxide solution and 200 ml. of 0.18 molar sodium borohydride in pyridine. The mixture is diluted with an excess of concentrated hydrochloric acid and extracted with ether. The washed and dried ether extract is evaporated to give 6α-fluoro-3β-hydroxy-11,20-allopregnandione.

To a solution of methylamine (11–12 g.) in 100 ml. of ethanol is added 10.0 g. of the allopregnandione and 0.3 g. of platinum oxide catalyst. The mixture is hydrogenated until one mole of hydrogen is absorbed and then worked up by removing the catalyst, evaporating the solvent and recrystallizing the residue to yield 6α-fluoro-3β-hydroxy-20α-methylamino - 11 - allopregnanone. The aminopregnane (10.0 g.) is dissolved in 500 ml. of chloroform and the solution stirred with two 500 ml. portions of 5% sodium hypochlorite solution for 30 minutes. The chloroform layer is washed, dried and evaporated to give 6α-fluoro-3β-hydroxy-20α-(N-methyl - N - chloroamino)-11-allopregnanone.

The N-chloroamine (5.0 g.) is dissolved in 50 ml. of trifluoroacetic acid and the solution is irradiated with ultraviolet light under nitrogen atmosphere for one hour. The acid is removed and the residual 18-chloro intermediate is treated with 25% methanolic potassium hydroxide as described in Example 3 to yield 6α-fluoro-3β-hydroxy-11-ketoconanine.

*Example 38*

A solution of 5.0 g. of 6α-fluoropregnane-3,20-dione (U.S. Patent No. 2,878,268) in methanol is treated with sodium borohydride in pyridine as described in Example 37 and similarly worked up to give 6α-fluoro-3α-hydroxy-pregnan-20-one. This compound (5.0 g.) is hydrogenated with approximately 5–7 g. of methylamine in 50 ml. of ethanol and 0.1 g. of platinum oxide catalyst to yield 6α-fluoro-3α-hydroxy - 20 - methylaminopregnane. The aminopregnane (2.5 g.) is dissolved in 250 ml. of chloroform and the solution stirred with two 300 ml. portions of 5% sodium hypochlorite solution. Evaporation of the dried chloroform layer gives 6α-fluoro-3α-hydroxy-20-(N-methyl-N-chloroamino)-pregnane.

The chloroamine (5.0 g.) is dissolved in 50 ml. of trifluoroacetic acid and irradiated with ultraviolet light under nitrogen for one hour. The acid is evaporated and the residual 18-chloro compound is dissolved in 100 ml. of methanol made strongly basic with 25% methanolic potassium hydroxide solution. The solution is refluxed for one hour, concentrated, poured into water and extracted with chloroform. Evaporation of the washed, dried chloroform extract yields 6α-fluoro-3α-hydroxy-5β-conanine.

*Example 39*

To a solution of methylamine in 200 ml. of ethanol (11–12.0 g. per 100 ml.) is added 0.5 g. of platinum oxide catalyst and 15.0 g. of 6β-fluoro-3β,5α-diacetoxy-20-allopregnanone which is obtained from the corresponding dihydroxy compound (U.S. Patent No. 2,838,528) by treatment with acetic anhydride in acetic acid solution at reflux for 24 hours. The mixture is hydrogenated until one mole of hydrogen is absorbed. The catalyst is removed and the solvent evaporated to give 6β-fluoro-3β,5α-diacetoxy-20 - methylaminoallopregnane. The diacetoxy pregnane is dissolved in chloroform and following the procedure of Example 18 the solution is stirred with 5% sodium hypochlorite solution, yielding upon workup 6β-fluoro-3β,5α-diacetoxy-20-(N-methyl - N - chloroamino)-allopregnane. Similarly, this compound (5.0 g.) is dissolved in 75 ml. of trifluoroacetic acid and irradiated with ultraviolet light under nitrogen for one hour. Working up the reaction mixture, followed by alkali hydrolysis as in Example 18 yields 6β-fluoro-3β,5α-dihydroxyconanine.

*Example 40*

To a stirred mixture of 25 g. of potassium bifluoride, 7.5 ml. of acetic anhydride and 100 ml. of acetic acid is added 13.0 g. of 20,20-ethylenedioxy-5α,6α-epoxy-3β-hydroxy-19-norallopregnane (prepared as in Example 18 of copending application Serial No. 821,348 filed June 19, 1959). The reaction mixture is stirred for two days at room temperature, methylene chloride is added and the solution washed with water. The methylene chloride solution is evaporated and the residue purified by chromatography to yield 3β,5α-dihydroxy-6β-fluoro-20,20-ethylenedioxy-19-norallopregnane. Hydrolysis of this compound (10.0 g.) in methanol and one normal aqueous sulfuric acid gives 3β,5α-dihydroxy-6β-fluoro-19-nor-20-allopregnanone.

Following the procedure outlined in Examples 18 and 39, the dihydroxy compound (10.0 g.) is converted to the diacetate with acetic anhydride in acetic acid solution which is hydrogenated with a solution of methylamine in 100 ml. of ethanol (10% w./w.) and platinum oxide catalyst until one mole of hydrogen is absorbed to give 3β,5α-diacetoxy-6β-fluoro-20-methylamino - 19 - norallopregnane. This compound (5.0 g.) is dissolved in 300 ml. of chloroform and the solution stirred with two 300 ml. portions of 5% sodium hypochlorite solution for one hour. Evaporation of the dried chloroform layer yields 3β,5α-diacetoxy-6β-fluoro - 20 - (N - methyl - N - chloroamino)-19-norallopregnane. The chloroamine (5.0 g.) is dissolved in 60 ml. of trifluoroacetic acid and irradiated with ultraviolet light under nitrogen atmosphere for 40 minutes. The acid is evaporated in vacuo and the residual 18-chloro intermediate is refluxed with 25% methanolic potassium hydroxide for 18 hours to yield 3β,5α-dihydroxy-6β-fluoro-19-norconanine.

*Example 41*

A solution of 20.0 g. of 3,11β-dihydroxy-19-nor-4-pregnen-20-one (U.S. Patent No. 2,878,267) in 250 ml. of methanol is hydrogenated at low pressure and at room temperature with 2.0 g. of 5% palladium-on-charcoal until one mole equivalent of hydrogen is absorbed. The catalyst is removed and the filtrate evaporated to give 3β,11β-dihydroxy-19-nor-20-allopregnanone which is converted to the diacetate by treatment with 50 ml. of acetic anhydride and 1.5 g. of p-toluenesulfonic acid in acetic acid solution. The acid solution is poured into water, made alkaline and the resulting 3β,11β-diacetoxy-19-nor-20-allopregnanone is dissolved in 200 ml. of ethanol containing 10% w./w. of methyamine and 0.5 g. of platinum oxide catalyst. The catalyst is removed from the reaction mixture and the solution evaporated. The residue is worked up by dissolving in ether and extracting into dilute hydrochloric acid. The acid extracts are neutralized, extracted with ether and the ether layer dried and evaporated to give 3β,11β-diacetoxy-20-methylamino-19-norallopregnane.

A solution of 10.0 g. of 3β,11β-diacetoxy-20-methylamino-19-norallopregnane in 500 ml. of chloroform is stirred with 500 ml. of 5% sodium hypochlorite solution for one hour, when the hypochlorite is removed and the treatment repeated. The chloroform layer is separated, washed, dried and evaporated in vacuo to give 3β,11β-diacetoxy - 20 - (N - methyl - N - chloroamino) - 19-norallopregnane.

The diacetoxy N - chloroamine (2.5 g.) is dissolved in 40 ml. of trifluoroacetic acid and irradiated with ultraviolet light under nitrogen atmosphere for 40 minutes. The acid is evaporated in vacuo and the residual 3β,11β-diacetoxy - 18 - chloro - 20 - methylamino - 19 - norallopregnane is dissolved in 125 ml. of methanol, adjusted to pH 11 to 12 with 25% methanolic potassium hydroxide solution. The solution is refluxed for 24 hours, concentrated in vacuo, poured into water and extracted with chloroform. The extract is washed, dried and evaporated to give 3β,11β-dihydroxy-19-norconanine.

This application is a continuation-in-part of application Serial No. 821,348, filed June 19, 1959, now U.S. Patent No. 2,983,736.

What is claimed is:
1. The method of forming conanine derivatives having the following formula:

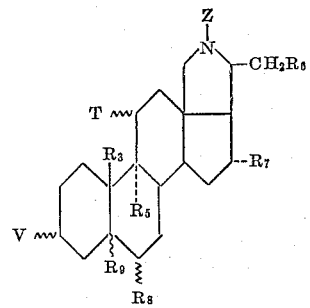

in which ξ is a configurational position selected from the group consisting of α and β; V and T are members selected from the group consisting of hydrogen, hydroxy and keto; $R_6$ and $R_9$ are members selected from the group consisting of hydrogen and hydroxy; $R_7$ is a member selected from the group consisting of hydrogen, hydroxy and methyl; $R_8$ is a member selected from the group consisting of hydrogen, fluoro, hydroxy and methyl; $R_3$ is a member selected from the group consisting of hydrogen and methyl; $R_5$ is a member selected from the group consisting of hydrogen and fluoro; and Z is lower alkyl, which comprises irradiating with ultraviolet light in the presence of trifluoroacetic acid a 20-(N-alkyl-N-haloamino) steroid having the following formula:

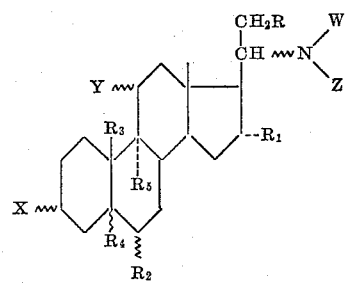

in which ξ is a configurational position selected from the group consisting of α and β; X is a member selected from the group consisting of hydrogen, hydroxy, acyloxy and keto; Y is a member selected from the group consisting of hydrogen, acyloxy and keto; R is a member selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, fluoro, hydroxy, acyloxy and methyl; $R_3$ is a member selected from the group consisting of hydrogen and methyl; $R_4$ is a member selected from the group consisting of hydrogen and acyloxy; $R_5$ is a member selected from the group consisting of hydrogen and fluoro; Z is lower alkyl; and W is halogen of atomic weight less than 80; each of said acyloxy moieties having a maximum of six carbon atoms, and treating with alkali the resultant intermediate 18-halo steroid having the following formula:

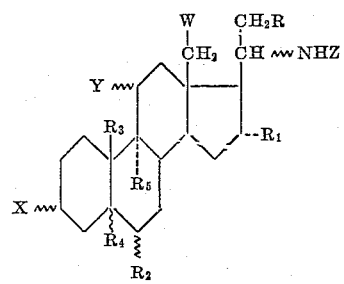

in which ξ, X, Y, R, $R_1$, $R_2$, $R_3$, $R_4$, $R_5$, Z and W are as defined above.

2. The method in accordance with claim 1 in which the alkali is an alkali metal hydroxide.

3. A compound having the formula:

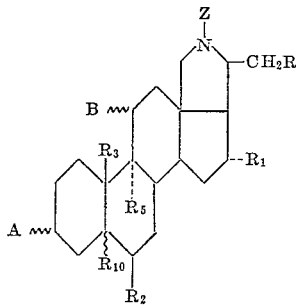

in which is a configurational position selected from the group consisting of α and β; A and B are members selected from the group consisting of hydroxy, acyloxy and keto; R and $R_{10}$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, fluoro, hydroxy, acyloxy and methyl; $R_3$ is a member selected from the group consisting of hydrogen and methyl; $R_5$ is a member selected from the group consisting of hydrogen and fluoro; and Z is lower alkyl; each of said acyloxy moieties having a maximum of six carbon atoms.

4. A compound having the formula:

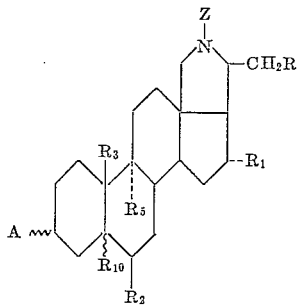

in which is a configurational position selected from the group consisting of α and β; A is a member selected from the group consisting of hydroxy, acyloxy and keto; R and $R_{10}$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, fluoro, hydroxy, acyloxy and methyl; $R_3$ is a member selected from the group consisting of hydrogen and methyl; $R_5$ is a member selected from the group consisting of hydrogen and fluoro; Z is lower alkyl; and with one of the substituents R, $R_1$, $R_2$ and $R_{10}$ being a member selected from the group consisting of hydroxy and acyloxy; each of said acyloxy moieties having a maximum of six carbon atoms.

5. A compound having the formula:

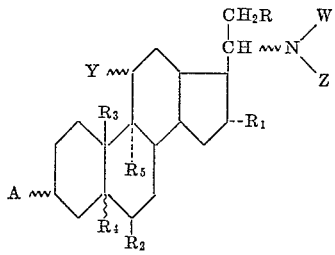

in which is a configurational position selected from the group consisting of α and β; A is a member selected from the group consisting of hydroxy, acyloxy and keto; Y is a member selected from the group consisting of acyloxy and keto; R is a member selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, fluoro, hydroxy, acyloxy and methyl; $R_3$ is a member selected from the group consisting of hydrogen and methyl; $R_4$ is a member selected from the group consisting of hydrogen and acyloxy; $R_5$ is a member selected from the group consisting of hydrogen and fluoro; Z is lower alkyl; and W is halogen of atomic weight less than 80; each of said acyloxy moieties having a maximum of six carbon atoms.

6. A compound having the formula:

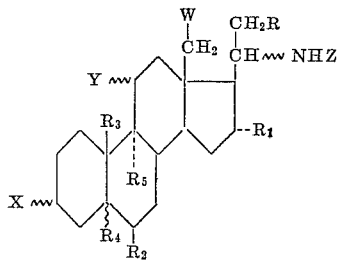

in which is a configurational position selected from the group consisting of α and β; X is a member selected from the group consisting of hydroxy, acyloxy and keto; Y is a member selected from the group consisting of acyloxy and keto; R is a member selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, fluoro, hydroxy, acyloxy and methyl; $R_3$ is a member selected from the group consisting of hydrogen and methyl; $R_4$ is a member selected from the group consisting of hydrogen and acyloxy; $R_5$ is a member selected from the group consisting of hydrogen and fluoro; Z is lower alkyl; and W is halogen of atomic weight less than 80; each of said acyloxy moieties having a maximum of six carbon atoms.

7. 3β,21-dihydroxy-11-ketoconanine.
8. 3α-hydroxy-11-keto-16α-methyl-5β-conanine.
9. 3α-hydroxy-11-keto-5β-conanine.
10. 3α,11α-dihydroxy-5β-conanine.
11. 3β,5α,11α-trihydroxy-6β-methylconanine.
12. 3,11-diketoconanine.
13. 6α,9α-difluoro-3β-hydroxy-11-ketoconanine.
14. 3β,11β-dihydroxy-19-norconanine.
15. A compound having the formula:

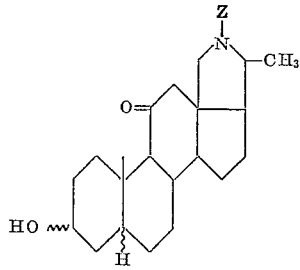

in which Z is lower alkyl.

16. A compound having the formula:

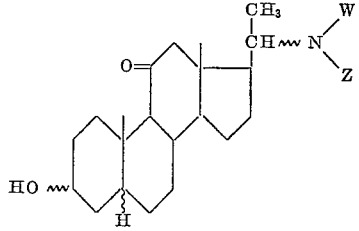

in which W is halogen of atomic weight less than 80 and Z is lower alkyl.

17. A compound having the formula:
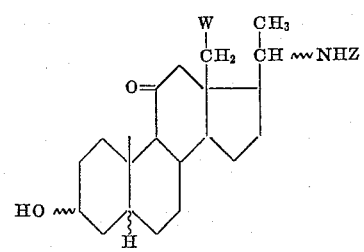
in which W is halogen of atomic weight less than 80 and Z is lower alkyl.
18. 18-chloro-20-methylamino-3,11-allopregnandione.
References Cited in the file of this patent
UNITED STATES PATENTS
2,912,432    Pappo et al. _____ Nov. 10, 1959
3,063,987    Pappo _____ Nov. 13, 1962
OTHER REFERENCES
Carey et al.: J.A.C.S., vol. 80, pages 2903–2904 (June 5, 1958).
Buchschacher et al.: J.A.C.S., vol. 80, pages 2905–6 (1958).